Figure 1:
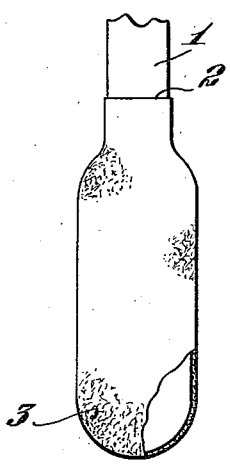

March 30, 1943.  R. E. BITTER ET AL  2,315,310
DIPPING FORM
Filed April 26, 1940

Inventor
Raymond E. Bitter
Duncan W. MacLeod
by Roberts, Cushman & Woodberry
att'ys.

Patented Mar. 30, 1943

2,315,310

UNITED STATES PATENT OFFICE 2,315,310

DIPPING FORM

Raymond E. Bitter, Cambridge, and Duncan W. MacLeod, Brighton, Mass., assignors, by mesne assignments, to General Latex and Chemical Corporation, Cambridge, Mass., a corporation of Massachusetts Application April 26, 1940, Serial No. 331,818

7 Claims. (Cl. 18—41)

Our invention relates to an improvement in the method of manufacturing rubber goods from dispersions of rubber by the use of dipping forms coated with an agglomerant for the rubber.

In the manufacture of such rubber articles as balloons, gloves, and the like it is customary to either (1) coat an impervious dipping form with a latex coagulant and then dip the form in a natural or artificial dispersion of rubber, rubber-like substances, or rubber substitutes, whether natural or artificial; or (2) dip the impervious form into the aqueous rubber dispersion, then into a coagulant and again into the rubber dispersion. Where the rubber-like material admits of vulcanization it may be vulcanized before use, during or after drying. The impervious forms are preferably of glass, hard rubber, glazed porcelain, aluminum, synthetic resins, or even wood which may be surfaced if needed with lacquers or varnishes.

When the coagulant bearing form comes in contact with the dispersion of rubber, the rubber deposits as a coagulum on the form, usually to an irreversible structure. When the coagulum has been built up to the desired thickness, this being controlled by the length of time the treated form is held in contact with the rubber dispersion, the form with its adhering coagulum is withdrawn from the dispersion. This process, whether performed by either of the alternative methods mentioned, may be called the coagulant-dip method.

As apart from the coagulant-dip method, applicant MacLeod has discovered a new method of dipping, the methods and materials of which are described in copending application Serial No. 237,461, filed October 28, 1938. Briefly, this newer method which may be called a developer dip method functions through the combined effects of a modified or sensitized aqueous rubber dispersion and a developer deposit on an impervious form, the developer not being a latex coagulant. An aqueous rubber dispersion sensitized or modified as described in said copending application will hereinafter be referred to exclusively as modified latex.

Both coagulant-dip or developer-dip methods have a common functional disadvantage, namely, that whether a coagulant or a developer is deposited on a dipping form the residue left on drying has a marked tendency to crystallize and produce a discontinuous coating of the form. This discontinuous coating may be observed (1) visually, though sometimes only by microscopic examination; (2) by the "twinkling" or non-uniform wetting of the deposit on the form while being immersed in the rubber dispersion; (3) by the grainy, mottled or non-uniform structure of the coagulum exhibited on uninflated articles; or (4) by the extreme mottled structure of thin and heavy spots when the dried coagulum is inflated.

We have found that this functional disadvantage is not overcome by wetting agents. Many wetting agents may be precipitated by the heavy metal salts of a coagulant solution, but even if precipitation is avoided, crystallization of the form deposit still persists.

Previously, various proposals have been made to remove this difficulty. These proposals have included the use of gel-forming materials together with the coagulant salt. Many of these gels, such as gelatine, add to the problem as, like the wetting agents, they are precipitated by the vehicle, salt, or acid comprising the fluid coagulant applied. Other proposals have suggested the use of low melting point salts in an endeavor to meet the crystallization problem by changes in the technique of application mainly avoiding drying.

We have discovered a new and novel means of preventing the formation of harmful crystal groupings of a latex agglomerant deposited on a form, regardless of whether the same is the residue from a coagulant or developer.

Our discovery is that soluble rubber agglomerants containing the interaction product of a metallic salt with a primary amine or a soluble agglomerant containing a metallic salt interacted with ammonia and a primary amine will not crystallize in harmful groupings but will crystallize uniformly in small particles which many times are flat or plate-like or at other times showing acicular crystals. In any event, these new agglomerants produce a more uniform coating than has hitherto been possible. We have further found that these agglomerants may be diluted with either water or volatile organic vehicles without unfavorably influencing the crystalline structure of the deposit left by the evaporation.

The accompanying drawing illustrates the coated dipping form and the steps of the method in which it is used to produce rubber articles.

Figure 2:
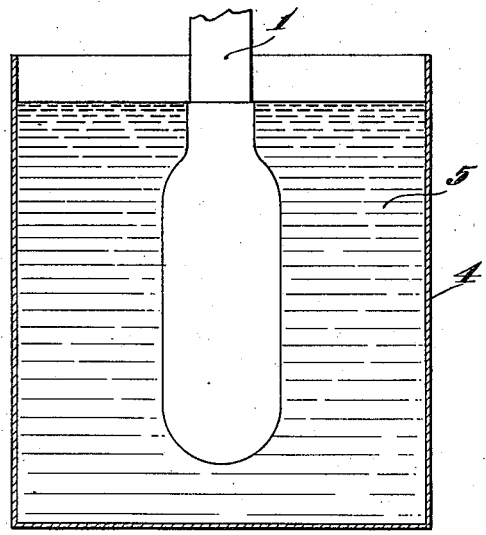
Figure 3:
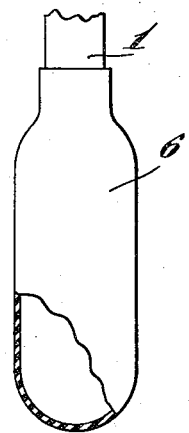

Fig. 1 shows the dipping form 1 coated with the crystal agglomerant coating ending at 2 on the neck of the form, said coating being partly broken away and portions of which are indicated by stippled areas such as 3;

Fig. 2 shows the coated form 1 immersed in a dipping tank 4 containing a rubber dispersion 5; and Fig. 3 shows the dipping form 1 after withdrawal from the dipping tank and carrying on its surface a layer of agglomerated latex 6, said layer being shown as partly broken away. The layer of agglomerated latex is then dried and vulcanized, if the rubber dispersion has not been prevulcanized, to form the rubber article desired.

*Coagulants—Class "A"*

Aluminum
Antimony
Bismuth
Iron (-ous and -ic)
Lead (-ic)
Manganese (-ous)
Mercury (-ic)
Tin (-ous and -ic)
Titanium

*Coagulants—Class "B"*

Zinc
Cadmium
Cobalt (-ous)
Copper (-ous and -ic)
Chromium (-ic)
Calcium
Strontium
Nickel
Barium Our discovery is concerned primarily with the interaction products of zinc, cadmium, cobalt (-ous), copper (-ous -ic), chromium (-ic or nickel with ammonia and a primary amine or with a primary amine alone. Generally although not invariably such interaction products are soluble. In any case a simple preliminary test, however, will indicate whether a soluble salt of one of said metals and any desired primary amine will in fact give a soluble interaction product.

Said soluble interaction products behave differently, dependent upon the metal and primary amine being utilized. For example, the following soluble interaction products are developers:

Zinc-ethylamine
Cobalt or chromium-urea
Zinc, cadmium or chromium-monoethanolamine However, the following closely related soluble interaction products are coagulants:

Zinc-butylamine
Zinc-urea

Obviously selection must be practiced when working with primary amines to obtain a suitable agglomerant for either modified or normal aqueous dispersions.

These soluble reaction products with primary amines we find to give desirable crystal properties when deposited from water or suitable organic vehicle on a form used for dipping. In fact, in some cases no crystal formation at all can be observed under a microscope even after strong heating.

We also have found that the addition of suitable primary amines to the reaction product of said metals with aqua ammonia gives the same favorable properties as regards crystal formation as we have noted when there is no ammonia present.

As examples of an agglomerant for developer dipping the following will illustrate:

|  | Parts by weight |
|---|---|
| (1) 26° Baumé aqua ammonia | 75 |
| Zinc chloride (anhydrous) | 25 |
| Vehicle | 150 |
| Monoethanolamine | 35 |
| (2) Monoethanolamine | 75 |
| Zinc chloride | 25 |
| Vehicle | 150 |

In these examples the diluent or so-called vehicle may be water or any organic solvent which does not interact with the other ingredients of the agglomerant solution to form a precipitate. The amount of vehicle may be altered to suit the circumstances, the more vehicle being utilized the less weight of deposit being retained on the form after it has been dipped into the agglomerant solution. In general water is the preferred vehicle. In some cases, however, a more rapidly drying organic vehicle than water may be desired to speed up evaporation and consequently cause the retention of more of the dried residue on the form, especially on sharp corners or sharp points. In such a case ordinary denatured alcohol may be used comprising about 95 parts of ethyl alcohol, 5 parts of water with denaturants, such as methanol, ethyl acetate, and aviation gasolene. The denatured alcohol seems to serve no other purpose than the one just described.

In Example 1 the addition of the zinc chloride is made directly to 26° Baumé aqueous ammonia and the interaction between these two reagents is accompanied by the generation of substantial quantities of heat. The addition of the vehicle or monoethanolamine to the ammonia reaction product should only be carried out after the heat of reaction has subsided. This interaction should be preferably carried out in water jacketed container vented through a condenser to the outside atmosphere and accompanied by a substantial amount of agitation. Likewise, the interaction between the monoethanolamine and zinc chloride as shown in Example 2 should be carried out in essentially the same procedure.

Any or all of these specific examples may be further compounded with desirable ingredients for many industrial applications. Where these materials are to be utilized in conjunction with impervious aluminum forms it is desirable to inhibit the action of the strongly alkaline agglomerants by the inclusion of a small amount of a soluble chromate salt, as for instance sodium chromate. The suggested value in these examples is from $\frac{1}{3}$ to $\frac{2}{3}$ parts of sodium chromate.

Certain types of forms, especially those which may carry many recesses or sharp curvatures may require the agglomerant solution to be even further compounded with a wetting agent so as to secure a more uniform spread of the agglomerant solution on the impervious surface. For this purpose we prefer to use a wetting agent whose activity is not reduced by the presence of any heavy metal reaction products. Such a material can be prepared by condensing ethylene oxide with di-ethylene glycol, this product in turn being esterified with a carboxylic acid such as oleic or ricinoleic acid. Such a material is not precipitated from the agglomerant solution if used in any of the examples suggested, and it is recommended to be used in the amount of about 1½ parts if indicated at all.

In the manufacture of certain rubber articles it is important that the interiors of the same be dusted to prevent cohesion of the rubber surface after the article has been removed from the dipping form. In the manufacture of toy balloons, for instance, where the forms have a restricted neck, it is desirable to lubricate these interior surfaces by compounding the agglomerant with a dusting medium. The preferred properties for such a medium require that it be of extremely small particle size, in the neighborhood of 1 or 2 microns, easily dispersed in the vehicle, and without reaction upon any of the alkaline reaction products to be used.

Such properties are met by air separated talc or certain varieties of silica. It is understood of course that the use of this dusting or lubricating medium is suggested only when circumstances require, and it is not considered as altering the crystallizing tendency of the agglomerant except that it may cover up a visual examination in this respect. The amount of such finely divided material suggested in many of the examples may well range from 16 to 25 parts.

Where rings are to be rolled upon the rubber article, it is desirable to have the agglomerant underneath the rubber portion, that is to eventually become the ring, free of any dusting medium, as such will interfere with the cohesion. To accomplish this two dips in an agglomerant solution may be necessary, the first dip being free of any dusting medium and covering the entire form, while the second dip containing the dusting medium should cover only that portion of the form above the point where the ring is to be rolled.

The exact chemical nature of the reaction products from ammonia and amines with the various salts described is open to considerable controversy. Many of the reaction products, however, have been studied by other investigators, and in general these materials are defined as ammonia or amino complexes. We have prepared these complexes not only from various metals but also from various salts of the same metal. We are unable to observe any difference in the interaction or changes in crystallization tendencies when zinc carbonate, zinc nitrate, zinc sulphate, zinc lactate or zinc benzoate are substituted for zinc chloride in Examples 1 and 2 cited.

In actual applications of the examples suggested the forms to be treated are assembled into some convenient dipping unit and rapidly plunged into the solutions and promptly withdrawn. The forms are allowed to drain for a short period of time depending upon their size and shape whereupon they may be up-ended or rotated or otherwise manipulated so as to distribute the agglomerant uniformly over the surface. We have found that drying such forms may take place at room temperature or at an elevated temperature at least up to 150° F. for a time as great as 20 minutes without affecting the crystalline nature of the deposit.

We claim:

1. A dipping form of impervious material coated with a latex agglomerating composition containing the interaction product of zinc chloride and monoethanolamine.

2. A dipping form of impervious material coated with a latex agglomerating composition containing the interaction product of zinc chloride, ammonia and monoethanolamine.

3. A dipping form of impervious material coated with a uniform coating of a latex agglomerating composition containing the interaction product of a primary amine with a substance containing a metal constituent selected from the group consisting of zinc, cadmium, cobalt (-ous), copper chromium, nickel.

4. A dipping form of impervious material coated with a uniform coating of a latex agglomerating composition containing the interaction product of ammonia and a primary amine with a substance containing a metal constituent selected from the group consisting of zinc, cadmium, cobalt (-ous), copper chromium, nickel.

5. An aluminum dipping form coated with a uniform coating of a strongly alkaline latex agglomerating composition containing a soluble chromate and the interaction product of a primary amine with a substance containing a metal constituent selected from the group consisting of zinc, cadmium, cobalt (-ous), copper, chromium, nickel.

6. A dipping form of impervious material coated with a uniform coating of a latex agglomerating composition containing a carboxylic acid ester of the condensation product of ethylene oxide and di-ethylene glycol, and the interaction product of a primary amine with a substance containing a metal constituent selected from the group consisting of zinc, cadmium, cobalt (-ous), copper, chromium, nickel.

7. A dipping form of impervious material coated with a uniform coating of a latex agglomerating composition containing a carboxylic acid ester of the condensation product of ethylene oxide and di-ethylene glycol, and the interaction product of ammonia and a primary amine with a substance containing a metal constituent selected from the group consisting of zinc, cadmium, cobalt (-ous), copper, chromium, nickel.

RAYMOND E. BITTER.
DUNCAN W. MacLEOD.